US012632534B2

(12) United States Patent
Rajeev et al.

(10) Patent No.: US 12,632,534 B2
(45) Date of Patent: May 19, 2026

(54) ACCESSING SECURE SYSTEM RESOURCES BY LOW PRIVILEGE PROCESSES

(71) Applicant: Microsoft Technology Licensing, LLC, Redmond, WA (US)

(72) Inventors: Kumar Rajeev, Redmond, WA (US); Ajay Preetham Barboza, Woodinville, WA (US); Viraf Rusi Gandhi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 15/989,984

(22) Filed: May 25, 2018

(65) Prior Publication Data

US 2019/0362066 A1 Nov. 28, 2019

(51) Int. Cl.
*G06F 21/44* (2013.01)
*G06F 21/31* (2013.01)

(52) U.S. Cl.
CPC ............ *G06F 21/445* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 8,078,740 B2 * | 12/2011 | Franco | .................... | G06F 21/53 |
| | | | | 709/229 |
| 8,181,182 B1 * | 5/2012 | Martin | .................... | G06F 9/485 |
| | | | | 718/104 |

| | | | | |
|---|---|---|---|---|
| 8,438,640 B1 * | 5/2013 | Vaish | ...................... | G06F 8/658 |
| | | | | 726/22 |
| 2003/0060189 A1 * | 3/2003 | Minear | ................... | H04L 63/12 |
| | | | | 455/560 |
| 2006/0123412 A1 * | 6/2006 | Hunt | ......................... | G06F 8/61 |
| | | | | 717/174 |

(Continued)

FOREIGN PATENT DOCUMENTS

| | | | | | |
|---|---|---|---|---|---|
| CA | 2660363 A1 * | 2/2008 | ......... | G06F 9/45533 |
| WO | WO-2012119218 A1 * | 9/2012 | ........... | G06F 21/554 |
| WO | WO-2013036472 A1 * | 3/2013 | ........... | G06F 21/335 |

OTHER PUBLICATIONS

[RFC8252] Denniss, W. and J. Bradley, "OAuth 2.0 for Native Apps", BCP 212, RFC 8252, DOI 10.17487/RFC8252, Oct. 2017, <https://www.rfc-editor.org/info/rfc8252>.*

(Continued)

*Primary Examiner* — Syed A Zaidi
*Assistant Examiner* — Vadim Savenkov
(74) *Attorney, Agent, or Firm* — ArentFox Schiff LLP

(57) ABSTRACT

Described are examples for enabling low privileged application to access secure system resources. A request from an application executing at a second privilege level can be received by a broker service executing at a first privilege level, where the request corresponds to accessing secure system resources. It can then be determined whether the application has a defined capability for accessing the secure system resources, whether the application has a protected status, and/or whether a user account associated with executing the application is part of a certain group of user accounts. Based on these determinations, access to the secure system resources can be provided to the application by the broker service.

21 Claims, 5 Drawing Sheets

200 —

(56) References Cited

U.S. PATENT DOCUMENTS

| | | | | |
|---|---|---|---|---|
| 2008/0178285 A1* | 7/2008 | Perlman | ................. | G06F 21/62 |
| | | | | 726/21 |
| 2012/0066512 A1* | 3/2012 | Kass | ..................... | G06F 21/71 |
| | | | | 713/189 |
| 2012/0117566 A1* | 5/2012 | Maeda | .................. | G06F 21/53 |
| | | | | 718/1 |
| 2012/0209923 A1* | 8/2012 | Mathur | .................. | G06F 21/53 |
| | | | | 709/229 |
| 2012/0209946 A1* | 8/2012 | McClure | ............ | H04L 41/0893 |
| | | | | 709/217 |
| 2012/0260250 A1* | 10/2012 | Maeda | .................. | G06F 21/53 |
| | | | | 718/1 |
| 2013/0024929 A1* | 1/2013 | Abraham | ............... | G06F 21/53 |
| | | | | 726/16 |
| 2013/0061316 A1* | 3/2013 | Iskin | ...................... | G06F 21/53 |
| | | | | 726/18 |
| 2013/0067531 A1* | 3/2013 | Morris | ................... | G06F 21/54 |
| | | | | 726/16 |
| 2013/0067600 A1* | 3/2013 | Graham | ............... | G06F 21/335 |
| | | | | 726/30 |
| 2013/0212575 A1* | 8/2013 | Ito | ........................... | G06F 21/53 |
| | | | | 718/1 |
| 2014/0130150 A1* | 5/2014 | Moshchuk | ............. | H04L 63/10 |
| | | | | 726/22 |
| 2015/0040224 A1* | 2/2015 | Litva | .................. | H04L 63/1441 |
| | | | | 726/23 |
| 2015/0089645 A1* | 3/2015 | Vandergeest | ........... | G06F 21/54 |
| | | | | 726/23 |
| 2015/0310209 A1* | 10/2015 | Zhang | ....................... | G06F 8/61 |
| | | | | 717/174 |
| 2016/0088016 A1* | 3/2016 | Emerson | ................ | H04L 63/20 |
| | | | | 726/1 |
| 2016/0381032 A1* | 12/2016 | Hashmi | ................ | G06F 9/5072 |
| | | | | 726/4 |
| 2016/0381135 A1* | 12/2016 | Mcgregor | .............. | H04L 69/18 |
| | | | | 709/229 |
| 2017/0177877 A1* | 6/2017 | Suarez | ................ | G06F 21/6218 |
| 2017/0244729 A1* | 8/2017 | Fahrny | ................... | G06F 21/54 |
| 2017/0244754 A1* | 8/2017 | Kinder | ................. | G06F 21/552 |
| 2017/0272544 A1* | 9/2017 | Sheppard | ............... | A63F 13/77 |
| 2018/0121665 A1* | 5/2018 | Anderson | .......... | G06F 21/6209 |
| 2018/0248702 A1* | 8/2018 | Wu | ........................ | G06F 21/64 |
| 2018/0285554 A1* | 10/2018 | Biswas | .............. | G06F 21/6281 |
| 2019/0005267 A1* | 1/2019 | Soman | .................... | H04L 63/20 |
| 2019/0080081 A1* | 3/2019 | Goodridge | ............. | G06F 9/445 |
| 2019/0087210 A1* | 3/2019 | Dowling | ............ | G06F 9/30174 |
| 2019/0108116 A1* | 4/2019 | Benes | ................... | G06F 21/552 |
| 2019/0163458 A1* | 5/2019 | Goodridge | ........... | G06F 21/604 |
| 2019/0339915 A1* | 11/2019 | Saito | .................... | G06F 3/1222 |
| 2021/0150067 A1* | 5/2021 | Lu | .......................... | G06F 21/31 |

OTHER PUBLICATIONS

User experience guidelines for Universal Windows Platform (UWP) apps, 2015.*
Russinovich, M. E., & Margosis, A. (2016). Troubleshooting with the Windows Sysinternals tools. Microsoft Press.*

* cited by examiner

200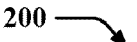

RECEIVE, BY A BROKER SERVICE EXECUTING AT A FIRST PRIVILEGE LEVEL, A REQUEST FOR ACCESSING SYSTEM RESOURCES FROM AN APPLICATION EXECUTING AT A SECOND PRIVILEGE LEVEL — 202

DETERMINE WHETHER THE APPLICATION PASSES ONE OR MORE ACCESS CHECKS FOR ACCESSING THE SYSTEM RESOURCES — 204

DETERMINE WHETHER THE APPLICATION IS ASSOCIATED WITH A CAPABILITY FOR ACCESSING SYSTEM RESOURCES — 206

DETERMINE WHETHER THE APPLICATION IS A PROTECTED PROCESS — 208

DETERMINE WHETHER A USER ACCOUNT ASSOCIATED WITH EXECUTING THE APPLICATION HAS ONE OR MORE DEFINED PROPERTIES — 210

PROVIDE ACCESS TO THE SYSTEM RESOURCES BASED AT LEAST IN PART ON DETERMINING THAT THE APPLICATION PASSES THE ONE OR MORE ACCESS CHECKS — 212

COMMUNICATE WITH A DEVICE DRIVER OPERATING IN KERNEL MODE TO ACCESS HARDWARE INFORMATION — 214

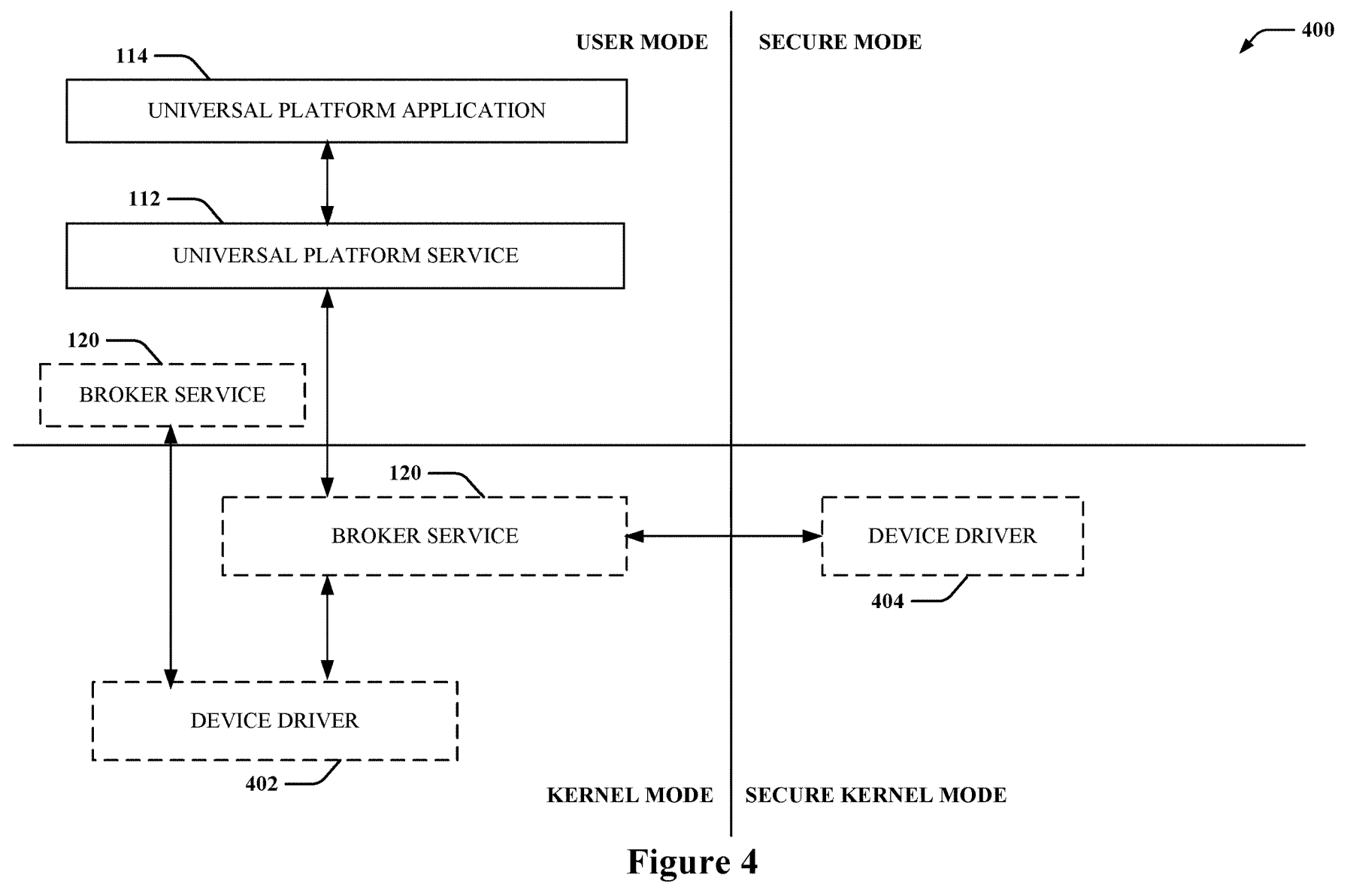

SECURE MODE

USER MODE

DEVICE DRIVER
404

SECURE KERNEL MODE

KERNEL MODE

114 UNIVERSAL PLATFORM APPLICATION

112 UNIVERSAL PLATFORM SERVICE

120 BROKER SERVICE

120 BROKER SERVICE

DEVICE DRIVER
402

Figure 4

ACCESSING SECURE SYSTEM RESOURCES BY LOW PRIVILEGE PROCESSES

BACKGROUND

Historically, hardware vendors implemented software applications for interacting with hardware to be executed on operating systems of computers that use the hardware. The software applications were executed by a user logged into the computer using the privileges and permissions associated with the user account, which typically included permissions to access the hardware and/or associated device drivers where the user account was part of an administrator group on the computer. More recently, universal platform services have evolved to execute on or with various operating systems, or versions of operating systems, on various devices to provide a single platform on which to execute various applications. This allows an application developer to implement a single application for executing on the various devices via the corresponding universal platform service. In most instances, however, the universal platform services execute on the operating system using a lower level privilege than the user account logged into the system, and thus may not have access to certain secure system resources, such as certain hardware and/or corresponding device drivers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for enabling low privileged application to access secure system resources is provided. The method includes receiving, by a broker service executing at a first privilege level, a request from an application executing at a second privilege level, where the request corresponds to accessing secure system resources, determining, by the broker service and based on receiving the request, whether the application has a defined capability for accessing the secure system resources, whether the application has a protected status, and whether a user account associated with executing the application is part of a certain group of user accounts, and providing, by the broker service and to the application, access to the secure system resources based at least in part on determining that the application has the defined capability, the application has the protected status, and the user account is part of the certain group of user accounts, wherein the second privilege level is insufficient for accessing the secure system resources.

In another example, a device for enabling low privileged application to access secure system resources is provided. The device includes a memory storing one or more parameters or instructions for executing a universal platform service, a universal platform application, and a broker service, and at least one processor coupled to the memory. The at least one processor is configured to receive, by the broker service executing at a first privilege level, a request from the universal platform application executing at a second privilege level, where the request corresponds to accessing secure system resources, determine, by the broker service and based on receiving the request, whether the universal platform application has a defined capability for accessing the secure system resources, whether the universal platform application has a protected status, and whether a user account associated with executing the universal platform application is part of a certain group of user accounts, and provide, by the broker service and to the universal platform application, access to the secure system resources based at least in part on determining that the universal platform application has the defined capability, the universal platform application has the protected status, and the user account is part of the certain group of user accounts, wherein the second privilege level is insufficient for accessing the secure system resources.

In another example, a computer-readable medium, including code executable by one or more processors for enabling low privileged application to access secure system resources is provided. The code includes code for receiving, by a broker service executing at a first privilege level, a request from an application executing at a second privilege level, where the request corresponds to accessing secure system resources, determining, by the broker service and based on receiving the request, whether the application has a defined capability for accessing the secure system resources, whether the application has a protected status, and whether a user account associated with executing the application is part of a certain group of user accounts, and providing, by the broker service and to the application, access to the secure system resources based at least in part on determining that the application has the defined capability, the application has the protected status, and the user account is part of the certain group of user accounts, wherein the second privilege level is insufficient for accessing the secure system resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a flow diagram of an example of a method for providing system resource access to applications executing at a lower privilege level.

FIG. 4 is a schematic diagram of an example of a system having multiple modes of operation to facilitate providing applications with access to system resources.

DETAILED DESCRIPTION

Figure 1:
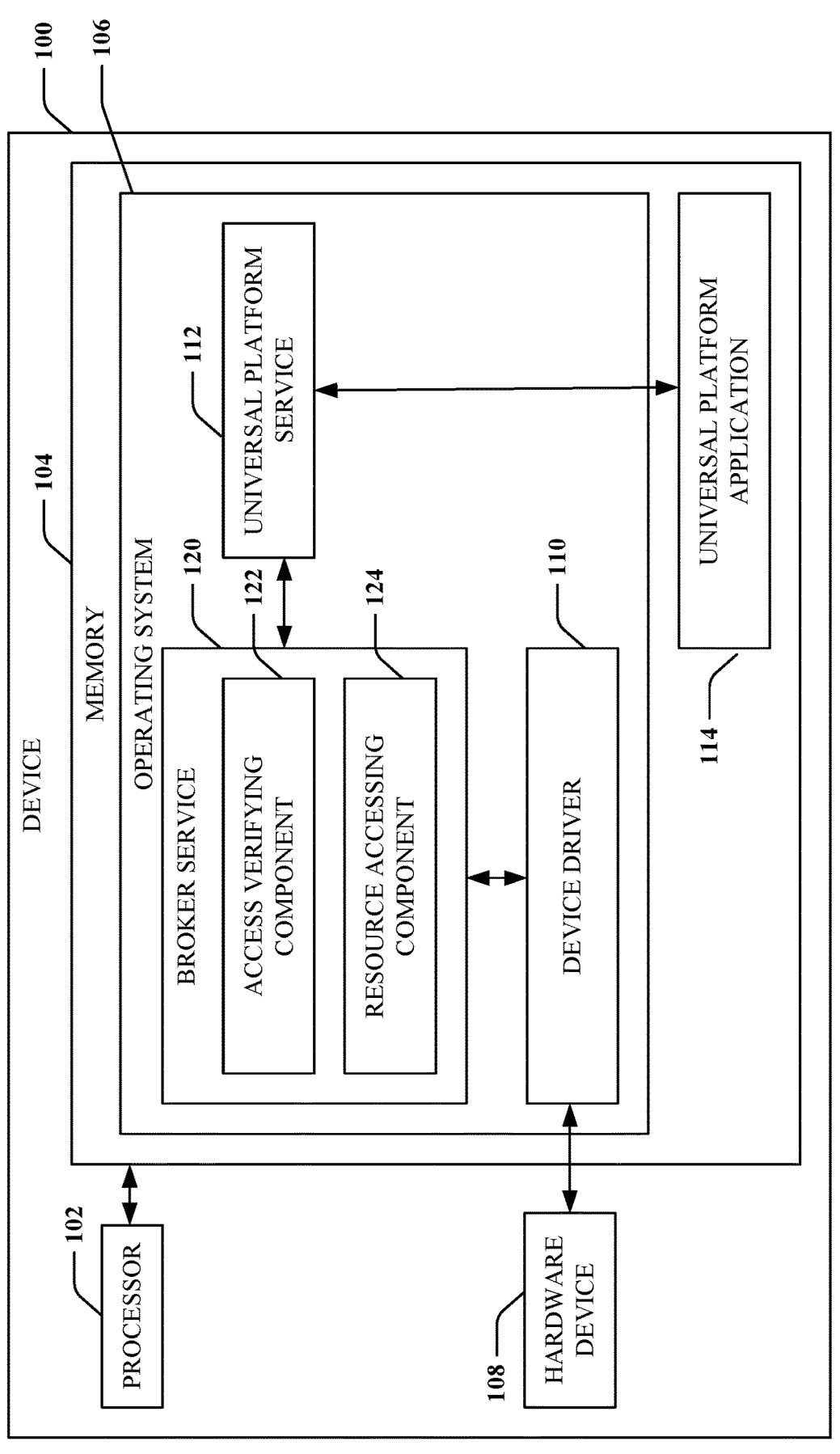
FIG. 1 is a schematic diagram of an example of a device for providing system resource access to applications executing at a lower privilege level.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to facilitating access to secure system resources by processes (e.g., applications) executing at a lower privilege level than typically needed to access the secure system resources. For example, the access to the secure system resources can be provided via a broker service that can execute in a kernel mode or otherwise in user mode at a higher privilege level than the process. The broker can perform one or more access checks for the process and can accordingly determine whether to provide the process with access to the secure system resources. For example, the broker service can verify that the process has one or more capabilities granted by the operating system on which the process executes. In another example, the broker service can verify that the process is a protected process based on one or more parameters defined by the operating system for protected processes. In another example, the broker service can verify that a user account that executes the process is part of a certain group of accounts having one or more permissions (e.g., an administrator group or other group that can access the secure system resources). Where one or more of the access checks are successful, the broker service can fulfill requests from the process for secure system resources and/or information regarding the secure system resources. In this regard, though the process may operate at a lower privilege level, the process may access secure system resources via the broker service.

In an example, the process may include an application configured to run on a universal platform service. For example, the universal platform service can execute on an operating system of a device to provide a platform on which the application can execute. Multiple devices, operating systems, operating system versions, etc. can include such a universal platform service such that an application developed for the universal platform service can execute on the various devices via the universal platform service. At least in some examples, the universal platform service may execute on the operating system at a lower privilege level, and may not have access to hardware, device drivers, etc. By virtue of executing via the universal platform service, a corresponding application may also execute at the lower privilege level (or an even lower privilege level—i.e., with the same or less set of privileges for accessing system resources). Thus, using the broker service, as described above and further herein, can allow such applications to access secure system resources, where the applications pass access checks instituted by the broker service.

Figure 3:
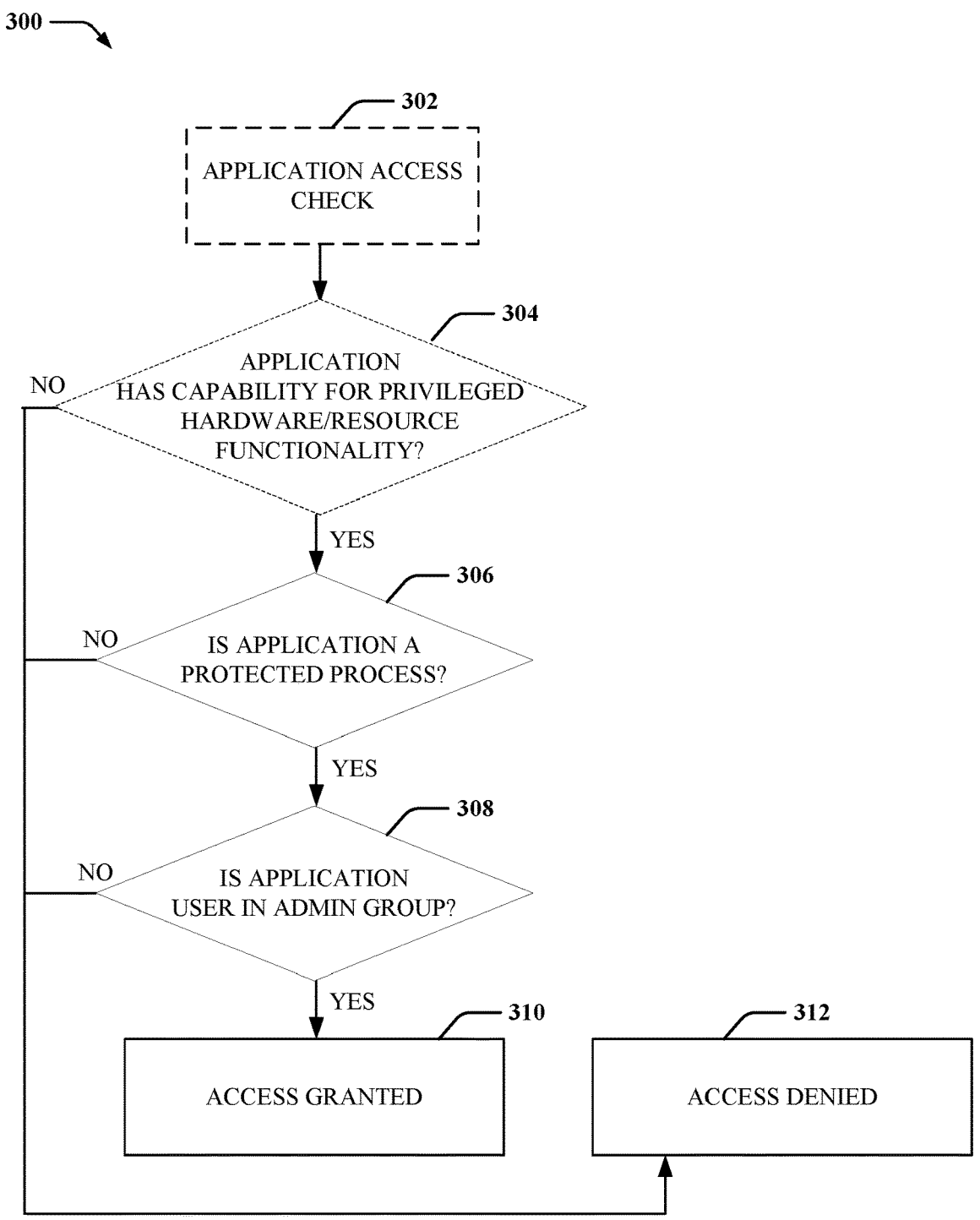
FIG. 3 is a flow diagram of an example of a method for granting or denying resource access based on performing multiple checks related to an application.

Turning now to FIGS. 1-5, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can provide low privilege level applications with access to system resources via a broker service. In an example, device 100 can include a processor 102 and/or memory 104 configured to execute or store instructions or other parameters related to providing an operating system 106, which can execute one or more applications or processes, such as a universal platform service 112, a universal platform application 114, and/or the like. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein.

Device 100 can also include one or more hardware devices 108, which may include devices related to operation of the device 100, such as an interface card or chip (e.g., display interface card, network interface card, audio interface card, universal serial bus card, etc.), for enabling input/output of data to/from the device 100 (and/or associated processor 102, memory 104, etc.) via one or more buses or other interfaces. For example, hardware device 108 may be coupled to the device 100 via a slot, port, or other interface for communicating within the device 100 via a bus. In any case, operating system 106 can communicate with the hardware device 108 via a device driver to facilitate communicating data to/from the hardware device 108, instructing the hardware device 108 with one or more parameters, commands, etc. for operation, and/or the like.

In an example, operating system 106 can provide a universal platform service 112 to create a universal environment for executing a universal platform application 114. For example, the universal platform application 114 can be implemented to execute in various environments via the universal platform service 112. For example, the universal platform service 112 can expose an interface (e.g., an application programming interface (API)) for use by the universal platform application 114 to operate in the operating environment of the device 100. For example, the universal platform service 112 can be specific to a type of the device 100, the operating system 106 of the device 100, a version of the operating system 106 of the device 100, etc., and various universal platform services 112 can provide similar interfaces such that the universal platform application 114 can operate on various devices, operating systems, operating system version, etc., in various contexts, environments, etc. without necessarily requiring new code for the universal platform application 114.

In an example, the universal platform service 112 can execute in a user mode to have permissions and/or privilege levels associated with a user account executing the universal platform service 112. In this example, the universal platform application 114 may also operate in the user mode associated with the user account (or another mode having lower privilege level). In this user mode, the universal platform application 114 may not be able to access certain system resources that require a higher privilege level. It is possible that access to such system resources is desired for the universal platform application 114, such as where the entity providing and/or developing the universal platform application 114 is a hardware vendor of the hardware device 108. For example, hardware vendors may desire access to provided hardware devices 108 via universal platform applications 114 developed by the hardware vendors (e.g., to provide hardware diagnostics, allow for updating hardware configuration or related parameters, etc.).

In this example, the broker service 120 can be used to facilitate access to system resources. For example, the broker service 120 can operate at a higher privilege level than the universal platform application 114 (and universal platform service 112), and may be allowed to access the system resources, such as device driver 110 and/or other secure or protected system resources. The broker service 120 can include an access verifying component 122 for verifying that the universal platform application 114 can have access to the system resources (e.g., as requested) based on performing one or more access checks of the universal platform application 114. The broker service 120 may also include a resource accessing component 124 for allowing access to the system resources based on an outcome of the one or more access checks for the universal platform application 114.

In this example, universal platform application 114 can request certain access to system resources via universal platform service 112. Universal platform service 112 can initiate a request for system resources from the broker service 120 based on the request from the universal platform application 114 and can provide certain parameters related to the universal platform application 114 to the broker service 120. For example, universal platform service 112 may provide an identification of an entity that developed the universal platform application 114 (e.g., a hardware vendor identity), an indication of one or more protected process parameters for the universal platform application 114, such as a digital signature used to sign the universal platform application 114, a user account associated with executing the universal platform application 114, and/or the like. The broker service 120 can use the provided parameters to perform the one or more access checks for the universal platform application 114, as described further herein. Where the one or more access checks pass, broker service 120 can facilitate system resource access for the universal platform application 114.

FIG. 2 is a flowchart of an example of a method 200 for providing an application that has a lower privilege level with access to system resources that typically require a higher privilege level. For example, method 200 can be performed by a device 100 and/or one or more components thereof to facilitate providing the system resources, or related information, to the application.

In method 200, at action 202, a request can be received by a broker service executing at a first privilege level, for accessing system resources from an application executing at a second privilege level can. In an example, broker service 120, e.g., in conjunction with processor 102, memory 104, operating system 106, etc., can execute at the first privilege level, and can receive a request for accessing system resources from an application (e.g., universal platform application 114) executing at the second privilege level. For example, the first privilege level, at which the broker service 120 executes, can be higher than the second privilege level and/or can otherwise have permissions associated with accessing system resources that the second privilege level does not have. As described, the universal platform application 114 may execute via the universal platform service 112 (e.g., in an application container associated with the universal platform service 112), and may inherit the lower privilege level therefrom. For example, the universal platform service 112 may execute at a privilege level associated with a user account that is logged into the operating system 106 and/or another lower level account. The lower privilege level may not have sufficient privileges or permissions to access some of the system resources, such as device driver 110 associated with hardware device 108.

In addition, for example, the request can relate to accessing information available via the device driver 110 (whether by querying the hardware device 108 or otherwise), such as firmware version or other hardware parameters/information. In another example, the request can relate to setting information, such as hardware configuration parameters, or otherwise communicating with the hardware device 108 to install firmware, change parameter values, and/or the like. The request can be based on an interface exposed via the device driver 110 to request the information, change the information, or otherwise communicate with the hardware device 108, etc., and can be callable via an interface provided by the universal platform service 112 to forward communications to the device driver 110. Thus, for example, a hardware vendor can implement the device driver 110 interface and the universal platform application 114 that communicates via the device driver 110 interface.

In method 200, at action 204, it can be determined whether the application passes one or more access checks for accessing the system resources. In an example, access verifying component 122, e.g., in conjunction with processor 102, memory 104, operating system 106, broker service 120, etc., can determine whether the application (e.g., the universal platform application 114) passes one or more access checks for accessing the system resources. As described, for example, this can be based on the request received from the application for accessing the system resources. In addition, the request may identify one or more parameters related to the application that can be used in performing the one or more access checks. In another example, the information can be separately provided to the broker service 120 or otherwise queried by the broker service 120. In one example, one check can include determining whether the calling thread is a universal platform application and/or from an application container process.

In one example, in performing the one or more access checks at action 204, optionally at action 206, it can be determined whether the application is associated with a capability for accessing the system resources. In an example, access verifying component 122, e.g., in conjunction with processor 102, memory 104, operating system 106, broker service 120, etc., can determine whether the application (e.g., universal platform application 114) is associated with a capability for accessing system resources. In an example, the application may be associated with a capability defined by the universal platform service 112 for accessing at least certain system resources. For example, universal platform service 112 may define capabilities that can be assigned to entities that author or develop universal platform applications, such that the universal platform applications can be enabled to perform one or more functions associated with the capability. In an example, a hardware vendor that develops a universal platform application can apply to a manufacturer of the universal platform service 112 to configure the universal platform application to receive the capability. The universal platform application can then implement the function, and the universal platform service 112 can verify the capabilities of the universal platform application as related to the developer of the application (e.g., the hardware vendor) in determining whether to perform the function or allow access to one or more resources.

Specifically, in an example, the entity developing the universal platform application 114 can apply (e.g., to the manufacturer of the universal platform service 112) for a capability for accessing the system resources. For example, the entity can specifically apply for the capability to access, via the universal platform application 114, device driver 110 for the hardware device 108, and the universal platform service 112 can store an association between the entity, as an author of the universal platform application 114, and the capability. Thus, in one example, in determining whether the application is associated with the capability, the access verifying component 122 can query the universal platform service 112 with information regarding the request to determine whether the application is associated with a capability identified in the request. In another example, access verifying component 122 may receive an indication of whether the entity is associated with the capability as part of the request for accessing system resources forwarded to the broker service 120 by the universal platform service 112.

As described, for example, the request and/or capability may relate to accessing device driver 110, generally, retrieving state information associated with the hardware device 108, setting hardware parameters and/or updating configuration for the hardware device 108, etc. In an example, the defined capability in the universal platform service 112 may be a general capability related to communicating with the device driver 110 and/or may be more granular as related to a specific communication with, or function of, the device driver 110. In an example, the universal platform application 114 can declare the capability or a related string, hash value, etc. in a manifest. The manifest and/or capability information can be provided to the broker service 120, which can validate the capability via the universal platform service 112.

In one example, in performing the one or more access checks at action 204, optionally at action 208, it can be determined whether the application is a privileged process. In an example, access verifying component 122, e.g., in conjunction with processor 102, memory 104, operating system 106, broker service 120, etc., can determine whether the application (e.g., universal platform application 114) is a protected process. For example, the operating system 106 can define a mechanism for protecting certain processes such that the processes may require authentication prior to or during executing, such that thread injection may not be allowed into the processes, such that one or more functions may not be allowed for or to the protected processes, and/or the like. For example, the operating system 106 may provide protected process functionality based on the process (or related application, such as universal platform application 114) being signed with a digital signature. In this example, the operating system 106 can verify the signature for executing the process relates to a trusted entity, allowing thread injection, allowing one or more functions to be performed, etc. Thus, for example, access verifying component 122 can determine whether the universal platform application 114 is a protected process. This may entail verifying (e.g., authenticating) a digital signature associated with or provided by the universal platform application 114.

For example, the digital signature, an indication of protected process, etc. can be declared in the application manifest, and provided to the broker service 120 for verification. In addition, the universal platform application 114 can be sent to the universal platform service 112 and/or an entity that manages the universal platform service 112 to be signed with a digital signature that can be verified in determining that the universal platform application 114 is a protected process.

In one example, in performing the one or more access checks at action 204, optionally at action 206, it can be determined whether a user account associated with executing the application has one or more defined properties. In an example, access verifying component 122, e.g., in conjunction with processor 102, memory 104, operating system 106, broker service 120, etc., can determine whether the user account associated with executing the application (e.g., the universal platform application 114) has the one or more defined properties. For example, access verifying component 122 can determine whether the user account associated with the universal platform application 114 (e.g., a user account logged into the operating system 106 when executing the universal platform application 114) is part of an administrator users group, or otherwise has certain permissions associated with the user account that may correspond to accessing system resources. In an example, determining whether the application passes the one or more access checks may include performing some or all of the determinations at actions 206, 208, 210.

In method 200, at action 212, access can be provided to the system resources based at least in part on determining that the application passes the one or more access checks. In an example, resource accessing component 124, e.g., in conjunction with processor 102, memory 104, operating system 106, broker service 120, etc., can provide access to the system resources based at least in part on determining that the application passes the one or more access checks. For example, the resource accessing component 124 can access the system resources (e.g., the device driver 110) via the operating system 106 and operating in a kernel mode, or otherwise in user mode at a higher privilege level than the universal platform application 114, having sufficient privileges to access the system resources, at least where the one or more access checks pass for the universal platform application 114. Providing access to the system resources may include, for example, determining whether to grant access to the system resources based on whether the one or more access checks pass.

In one example, in providing access to the system resources at action 212, optionally at action 214, a device driver operating in kernel mode can be communicated with the access hardware information. In an example, resource accessing component 124, e.g., in conjunction with processor 102, memory 104, operating system 106, broker service 120, etc., can communicate with the device driver (e.g., device driver 110) operating in kernel mode to access the hardware information. For example, resource accessing component 124 can communicate with the device driver 110 based on the request to obtain information or parameters therefrom, set hardware configuration information or parameters, update the configuration, etc.

FIG. 3 is a flowchart of an example of a method 300 for determining whether to grant access of system resources to a lower privilege application. For example, method 300 can be performed by a device 100 and/or one or more components thereof to facilitate granting or denying access to the system resources.

In method 300, at action 302 in an example, an application access check can be performed. In an example, access verifying component 122, e.g., in conjunction with processor 102, memory 104, operating system 106, broker service 120, etc., can determine to perform the application access check to determine whether the application has a capability for privileged hardware resource/functionality (e.g., to access system resources, as described herein). For example, universal platform service 112 can request the read access to a configuration value related to a device driver (e.g., device driver 110) and/or a corresponding hardware device (e.g., hardware device 108) on behalf of the universal platform application 114.

At action 304, it can be determined whether the application has capability for privileged hardware resource/functionality. In an example, access verifying component 122, e.g., in conjunction with processor 102, memory 104, operating system 106, broker service 120, etc., can determine whether the application has capability for the privileged hardware resource/functionality. As described, for example, access verifying component 122 can query the universal platform service 112 to determine whether the application has the capability for a hardware configuration read and/or hardware configuration write. The entity that developed the universal platform application 114 can apply for the capability for privileged hardware access from the operating system 106 and/or universal platform service 112 manufacturer, and an association can be defined in the operating system 106 and/or universal platform service 112 between the entity and the privileged hardware access capability. In this example, the entity can be identified from the universal platform application 114, and access verifying component 122 can check whether the entity has the capability for hardware configuration read.

If so, at action 306, it can be determined whether the application is a protected process. In an example, access verifying component 122, e.g., in conjunction with processor 102, memory 104, operating system 106, broker service 120, etc., can determine whether the application is a protected process. For example, access verifying component 122 can obtain a signature related to the universal platform application 114 executing as a process, and can verify or authenticate the signature in determining whether the process is protected.

If so, at action 308, it can be determined whether the application user is in an administrator group. In an example, access verifying component 122, e.g., in conjunction with processor 102, memory 104, operating system 106, broker service 120, etc., can determine whether the application user is in the administrator group. For example, access verifying component 122 can query the operating system 106 to determine whether the user account logged into the operating system 106 or otherwise associated with executing the universal platform application 114, is in an administrator group. For example, the administrator group can be defined by the operating system 106 to include a group of one or more users that can have permissions associated with accessing, modifying, etc., certain system resources.

If the user is in the admin group, at action 310, access can be granted to the system resources. In an example, resource accessing component 124, e.g., in conjunction with processor 102, memory 104, operating system 106, broker service 120, etc., can grant access to the system resources. This may include providing information associated with reading and/or writing information from the hardware.

If it is determined, at action 304, that the application does not have the capability for the privileged hardware resource/functionality, at action 306, that the application is not a protected process, or at action 308, that the user is not in the admin group, access to the system resources can be denied at action 312. In this example, access verifying component 122, e.g., in conjunction with processor 102, memory 104, operating system 106, broker service 120, etc., can indicate denial of access to the universal platform service 112 for the hardware access request, and/or universal platform service 112 may notify the universal platform application 114 that the access request is denied.

FIG. 4 illustrates an example of a system 400 (e.g., an operating system or at least a portion thereof) operating on a processor to provide access to system resources. System 400 includes a universal platform application 114 that can communicate with a universal platform service 112 in a user mode of an operating system to execute in an environment provided by the universal platform service 112. Universal platform application 114 and universal platform service 112 may execute in a user mode, which may be a non-secure portion of system 400. As described, for example, universal platform service 112 can expose an interface to obtain and/or modify information of a hardware device (e.g., via device driver 110) where the interface facilitates communicating with the broker service 120 to communicate with the device driver 110.

In addition, system 400 may have a kernel mode within which broker service 120 and/or a device driver 402 can operate at a higher privilege level than the universal platform application 114 and universal platform service 112 with respect to accessing system resources via the operating system. System 400 can also include a secure kernel mode via which a device driver 404 can operate to communicate with a hardware device. Broker service 120 can thus communicate with device drivers (e.g., device driver 402) in the kernel mode and/or device drivers (e.g., device driver 404) in the secure kernel mode. In another example, broker service 120 may operate in user mode at a higher privilege level than the universal platform application 114 to communicate with the device drivers (e.g., device driver 402). In any case, broker service 120, by operating in the kernel mode, can provide access to system resources via the operating system and to the universal platform application 114, as described herein, where the system resources may not otherwise be accessible via the user mode.

Figure 5:
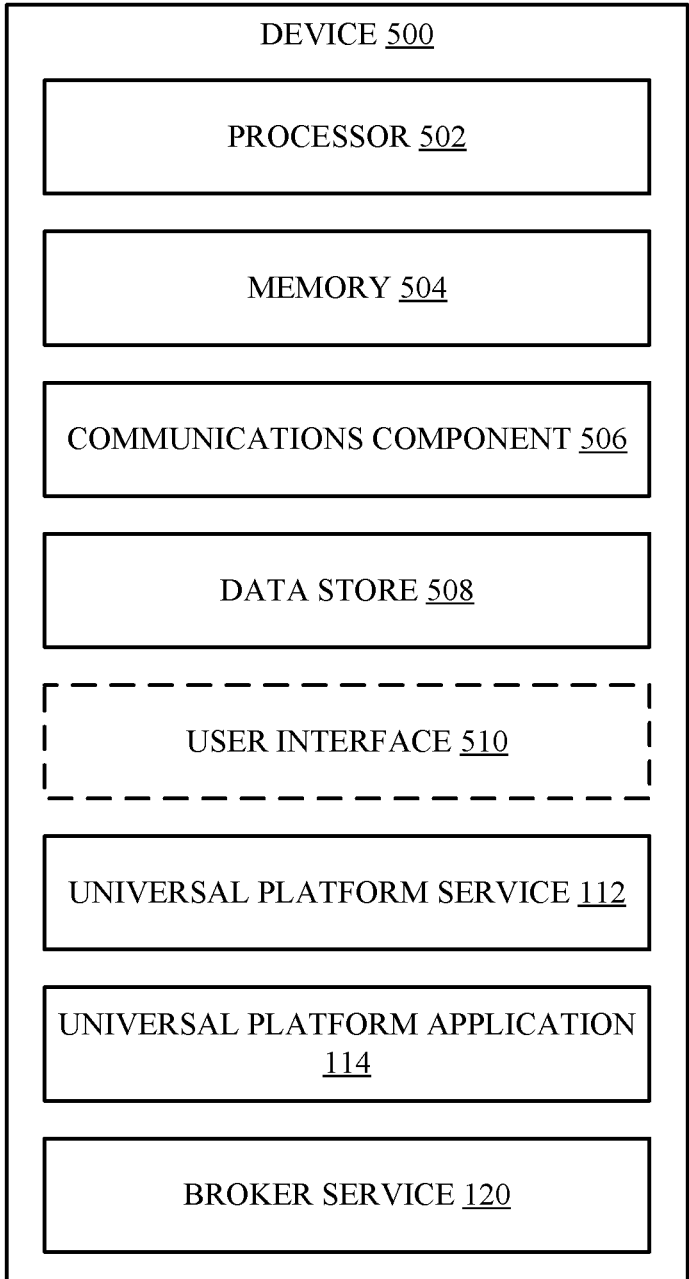
FIG. 5 is a schematic diagram of an example of a device for performing functions described herein.

FIG. 5 illustrates an example of device 500 including additional optional component details as those shown in FIG. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as universal platform service 112, universal platform application 114, broker service 120, etc., related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for universal platform service 112, universal platform application 114, broker service 120, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include a universal platform service 112 for providing a platform for executing universal platform application 114, which can be executable on various devices, operating systems, operating system versions, etc. that execute corresponding universal platform services 112. Device 500 may also include a broker service 120 to provide system resource access to universal platform applications 114, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for enabling low privileged application to access secure system resources, comprising:

receiving, by a broker service executing at a first privilege level, a request from an application executing at a second privilege level, wherein the request corresponds to accessing secure system resources, wherein the application executes in a universal platform service provided by an operating system to allow execution of the application without the application having code specific to the operating system, and wherein the universal platform service executes at the second privilege level;

determining, by the broker service and based on receiving the request, whether the application is allowed to access the secure system resources, whether the application has a protected status, and whether a user account associated with executing the application is part of a certain group of user accounts, wherein determining whether the application is allowed to access secure system resources comprises the broker service querying the universal platform service to receive an indication of whether an entity that authored the application is assigned a capability for accessing the secure system resources;

providing, by the broker service and to the application, access to the secure system resources based at least in part on determining that the application has the defined capability, the application has the protected status, and the user account is part of the certain group of user accounts, wherein the second privilege level is insufficient for accessing the secure system resources.

2. The method of claim 1, wherein determining whether the application has the protected status comprises determining whether the application is signed by a trusted entity.

3. The method of claim 1, wherein the certain group of user accounts corresponds to an administrator group of user accounts having one or more permissions related to accessing the secure system resources.

4. The method of claim 1, wherein providing access to the secure system resources comprises communicating, by the broker service, with a device driver operating in a kernel mode to access hardware information on behalf of the request from the application.

5. The method of claim 4, wherein accessing the hardware information comprises reading or writing a value to a configuration parameter.

6. The method of claim 1, wherein the secure system resources include a device driver associated with a hardware device, and wherein the request relates to installing firmware on the hardware device.

7. The method of claim 6, wherein the entity that authored the application authored the device driver.

8. The method of claim 1, wherein the protected status is defined by the operating system based on requiring authentication prior to or during execution of the application.

9. The method of claim 1, wherein the protected status is defined by the operating system based on whether thread injection is allowed for the application.

10. The method of claim 1, wherein the broker service receives an application manifest indicating one or more of the protected status for the application.

11. The method of claim 1, wherein the broker service receives an application manifest indicating a digital signature for the application, wherein determining whether the application has the protected status comprises determining whether the digital signature corresponds to a trusted entity.

12. A device for enabling low privileged application to access secure system resources, comprising:

a memory storing one or more parameters or instructions for executing a universal platform service, a universal platform application, and a broker service; and at least one processor coupled to the memory, wherein the at least one processor is configured to:

receive, by the broker service executing at a first privilege level, a request from the universal platform application executing at a second privilege level, wherein the request corresponds to accessing secure system resources, wherein the application executes in a universal platform service provided by an operating system to allow execution of the application without the application having code specific to the operating system, and wherein the universal platform service executes at the second privilege level;

determine, by the broker service and based on receiving the request, whether the universal platform application is allowed to access the secure system resources, whether the universal platform application has a protected status, and whether a user account associated with executing the universal platform application is part of a certain group of user accounts, wherein determining whether the application is allowed to access secure system resources comprises the broker service querying the universal platform service, which includes a repository of application authoring entities and associated system resources to receive an indication of whether an entity that authored the application is assigned a capability for accessing the secure system resources;

provide, by the broker service and to the universal platform application, access to the secure system resources based at least in part on determining that the universal platform application has the defined capability, the universal platform application has the protected status, and the user account is part of the certain group of user accounts, wherein the second privilege level is insufficient for accessing the secure system resources.

13. The device of claim 12, wherein the at least one processor is configured to determine whether the application has the protected status at least in part by determining whether the application is signed by a trusted entity.

14. The device of claim 12, wherein the certain group of user accounts corresponds to an administrator group of user accounts having one or more permissions related to accessing the secure system resources.

15. The device of claim 12, wherein the at least one processor is configured to provide access to the secure system resources at least in part by communicating, by the broker service, with a device driver operating in a kernel mode to access hardware information on behalf of the request from the universal platform application.

16. The device of claim 15, wherein accessing the hardware information comprises reading or writing a value to a configuration parameter.

17. A non-transitory computer-readable medium, comprising code executable by one or more processors for enabling low privileged application to access secure system resources, the code comprising code for:

receiving, by a broker service executing at a first privilege level, a request from an application executing at a second privilege level, wherein the request corresponds to accessing secure system resources, wherein the application executes in a universal platform service provided by an operating system to allow execution of the application without the application having code specific to the operating system, and wherein the universal platform service executes at the second privilege level;

determining, by the broker service and based on receiving the request, whether the application is allowed to access the secure system resources, whether the application has a protected status, and whether a user account associated with executing the application is part of a certain group of user accounts, wherein determining whether the application is allowed to access secure system resources comprises the broker service querying the universal platform service, which includes a repository of application authoring entities and associated system resources to receive an indication of whether an entity that authored the application is assigned a capability for accessing the secure system resources;

providing, by the broker service and to the application, access to the secure system resources based at least in part on determining that the application has the defined capability, the application has the protected status, and the user account is part of the certain group of user accounts, wherein the second privilege level is insufficient for accessing the secure system resources.

18. The non-transitory computer-readable medium of claim 17, wherein the code for determining determines whether the application has the protected status at least in part by determining whether the application is signed by a trusted entity.

19. The non-transitory computer-readable medium of claim 17, wherein the certain group of user accounts corresponds to an administrator group of user accounts having one or more permissions related to accessing the secure system resources.

20. The non-transitory computer-readable medium of claim 17, wherein the code for providing provides access to the secure system resources at least in part by communicating, by the broker service, with a device driver operating in a kernel mode to access hardware information on behalf of the request from the application.

21. The non-transitory computer-readable medium of claim 20, wherein the code comprises code for accessing the hardware information including code for reading or writing a value to a configuration parameter.

* * * * *